United States Patent
Gavand et al.

(10) Patent No.: US 11,956,142 B2
(45) Date of Patent: Apr. 9, 2024

(54) PATH SELECTION FOR DATA TRAFFIC WITHIN A SOFTWARE-DEFINED WIDE AREA NETWORK USING TRAFFIC METRICS

(71) Applicant: Versa Networks, Inc., San Jose, CA (US)

(72) Inventors: Amey Gavand, San Jose, CA (US); Jayakrishnan V. Iyer, Morgan Hill, CA (US); Apurva Mehta, Cupertino, CA (US); Pani Ayyappa, Fremont, CA (US); Mukul Katiyar, Pleasanton, CA (US); Ramanarayanan Ramakrishnan, San Jose, CA (US)

(73) Assignee: Versa Networks, Inc., San Jose, CA (US)

( * ) Notice: Subject to any disclaimer, the term of this patent is extended or adjusted under 35 U.S.C. 154(b) by 2 days.

(21) Appl. No.: 17/407,102

(22) Filed: Aug. 19, 2021

(65) Prior Publication Data

US 2023/0059537 A1    Feb. 23, 2023

(51) Int. Cl.
*H04L 12/815* (2013.01)
*H04L 12/24* (2006.01)
*H04L 12/26* (2006.01)
*H04L 43/062* (2022.01)
*H04L 43/16* (2022.01)
*H04L 45/12* (2022.01)
*H04L 67/104* (2022.01)

(52) U.S. Cl.
CPC .......... *H04L 45/123* (2013.01); *H04L 43/062* (2013.01); *H04L 43/16* (2013.01); *H04L 67/104* (2013.01)

(58) Field of Classification Search
CPC ..... H04L 45/123; H04L 43/062; H04L 43/16; H04L 67/104; H04L 41/0668; H04L 67/1006; H04L 69/24; H04L 41/5009; H04L 43/0829; H04L 43/0852; H04L 43/10

See application file for complete search history.

(56) References Cited

U.S. PATENT DOCUMENTS

| 11,469,999 | B1 * | 10/2022 | Gandhi | H04L 45/14 |
| 2019/0052558 | A1 * | 2/2019 | Mehta | H04L 45/64 |
| 2019/0268421 | A1 * | 8/2019 | Markuze | H04L 67/10 |
| 2019/0386918 | A1 * | 12/2019 | Iyer | H04L 43/0829 |
| 2020/0204469 | A1 * | 6/2020 | Filsfils | H04L 45/123 |

(Continued)

OTHER PUBLICATIONS

Dima Matt Yahov, Versa SDWAN Topologies, Sep. 4, 2019, Versa Networks, 10:50-12:40, URL retrieved via: https://www.youtube.com/watch?v=6ub2MxWKWw8 (Year: 2019).*

*Primary Examiner* — Schquita D Goodwin
(74) *Attorney, Agent, or Firm* — LOZA & LOZA, LLP

(57) ABSTRACT

Embodiments herein disclose path selection for data traffic within a software-defined wide area network using traffic metrics. Some embodiments relate to a method that includes polling peers of the SD-WAN for traffic metrics, receiving traffic metrics from at least a portion of the peers, combining the received traffic metrics, calculating performance of a plurality of possible paths from a source node to a destination node, the nodes being within the SD-WAN topology, and selecting a path from the source node to the destination node based on the calculated performance.

20 Claims, 10 Drawing Sheets

(56) References Cited

U.S. PATENT DOCUMENTS

| | | | |
|---|---|---|---|
| 2020/0278892 A1* | 9/2020 | Nainar | H04L 67/10 |
| 2020/0296012 A1* | 9/2020 | Paruchuri | H04L 43/028 |
| 2021/0067468 A1* | 3/2021 | Cidon | H04L 41/0813 |
| 2021/0152450 A1* | 5/2021 | Iyer | H04L 41/40 |
| 2021/0160169 A1* | 5/2021 | Shen | H04L 45/64 |
| 2021/0304026 A1* | 9/2021 | Mermoud | H04L 45/58 |
| 2022/0029857 A1* | 1/2022 | Ponnuru | H04L 12/4633 |
| 2022/0052949 A1* | 2/2022 | Shen | H04L 47/225 |
| 2022/0060408 A1* | 2/2022 | Manickam | H04L 47/2425 |
| 2022/0210038 A1* | 6/2022 | Pueblas | H04L 41/0686 |
| 2022/0217015 A1* | 7/2022 | Vuggrala | H04L 41/5019 |
| 2022/0272029 A1* | 8/2022 | Vasseur | H04L 45/02 |
| 2023/0012609 A1* | 1/2023 | Wang | H04L 43/10 |
| 2023/0027969 A1* | 1/2023 | Vasseur | H04L 45/42 |
| 2023/0031921 A1* | 2/2023 | Devendran | H04L 43/10 |

\* cited by examiner

PATH SELECTION FOR DATA TRAFFIC WITHIN A SOFTWARE-DEFINED WIDE AREA NETWORK USING TRAFFIC METRICS

TECHNICAL FIELD

The embodiments herein relate to data traffic through software-defined wide area networks and, more particularly, to selecting a path from among multiple paths through the network using available traffic metrics.

BACKGROUND

Network data communications may rely on virtualized resources to carry the data. A VNF (Virtual Network Function) may take the place of a hardware router. An SD-WAN (Software-Defined Wide Area Network) may take the place of dedicated physical network resources. An SD-WAN may have at least one designated hub node for each of the branch nodes. The hub nodes are able to act as a gateway to a plurality of branch nodes. The branch nodes themselves may have direct access to the Internet through one or more WAN links as well as through the hub nodes.

An MP-BGP (Multiprotocol Border Gateway Protocol) control plane will announce routes and path metrics that may be used to select a path using SD-WAN policies. The next hop on a route may be selected using monitored metrics or using metrics obtained by sending a probe. When it works well, this policy-based approach allows the packet to be sent to the next node with the best connectivity. A path is selected based on the results returned by the probe. This allows a path to be selected that runs to the destination node.

SUMMARY

Embodiments herein disclose path selection for data traffic within a software-defined wide area network using traffic metrics. Some embodiments relate to a method that includes polling peers of the SD-WAN for traffic metrics, receiving traffic metrics from at least a portion of the peers, combining the received traffic metrics, calculating performance of a plurality of possible paths from a source node to a destination node, the source node and the destination node being within the SD-WAN topology, and selecting a path from the source node to the destination node based on the calculated performance.

In some embodiments, the received traffic metrics comprise existing site-to-site monitoring collected by point-to-point peers independent of receiving a poll. In some embodiments, the site-to-site monitoring comprises Service Level Agreement (SLA) monitoring. In some embodiments, calculating performance comprises performing path calculations by applying the received traffic metrics to thresholds. In some embodiments, the thresholds provide a value difference within which two paths are considered to be equal.

In some embodiments, performing path calculations comprises using a Dijkstra Algorithm of thresholds with weight ranges. In some embodiments, using the Dijkstra algorithm comprises performing the Dijkstra Algorithm by punching in configured weight ranges in Shortest Path First (SPF) runs.

In some embodiments, selecting the path comprises comparing traffic metrics for hops of a candidate path to a cost range for other candidate paths. In some embodiments, the traffic metrics represent at least one of path latency and packet loss. In some embodiments, selecting the path comprises selecting the path having a lowest path latency. In some embodiments, selecting the path comprises applying path routing constraints.

Some embodiments include receiving an indication of a link failure in the selected path, the method further comprising selecting a second path from the source node to the destination node in response to the received link failure indication. In some embodiments, selecting the path comprises selecting the path at a control plane, the method further comprising sending the selected path to a data plane of the SD-WAN topology.

Some embodiments include the data plane receiving a list of Spoke-Hub-Hub-Spoke (SHHS) paths from a plurality of spokes and the data plane selecting the path using the list of SHHS paths.

Some embodiments relate to a non-transitory computer-readable storage medium containing program instructions, wherein execution of the program instructions by the computer causes the computer to perform operations that include polling peers of a software-defined wide area network (SD-WAN) for traffic metrics, receiving traffic metrics from at least a portion of the peers, combining the received traffic metrics, calculating performance of a plurality of possible paths from a source node to a destination node, the source node and the destination node being within the SD-WAN topology, and selecting a path from the source node to the destination node based on the calculated performance.

In some embodiments, calculating performance comprises performing path calculations by applying the received traffic metrics to thresholds, wherein the thresholds provide a value difference within which two paths are considered to be equal. In some embodiments, the traffic metrics represent at least one of path latency and packet loss and wherein selecting the path comprises selecting the path having a lowest path latency.

Some embodiments relate to a network node that includes a path metrics monitor configured to poll peers of a software-defined wide area network (SD-WAN) for traffic metrics, to receive traffic metrics from at least a portion of the peers and to combine the received traffic metrics, and a topology and path selection engine configured to calculate performance of a plurality of possible paths from a source node to a destination node, the source node and the destination node being within the SD-WAN topology, and to select a path from the source node to the destination node based on the calculated performance.

In some embodiments, the received traffic metrics comprise existing site-to-site monitoring collected by point-to-point peers independent of receiving a poll. In some embodiments, the topology and path selection engine is further configured to compare traffic metrics of hops of a candidate path to a cost range for other candidate paths.

BRIEF DESCRIPTION OF THE FIGURES

The embodiments herein will be better understood from the following detailed description with reference to the drawing figures, in which.

DETAILED DESCRIPTION OF EMBODIMENTS

Figure 1:
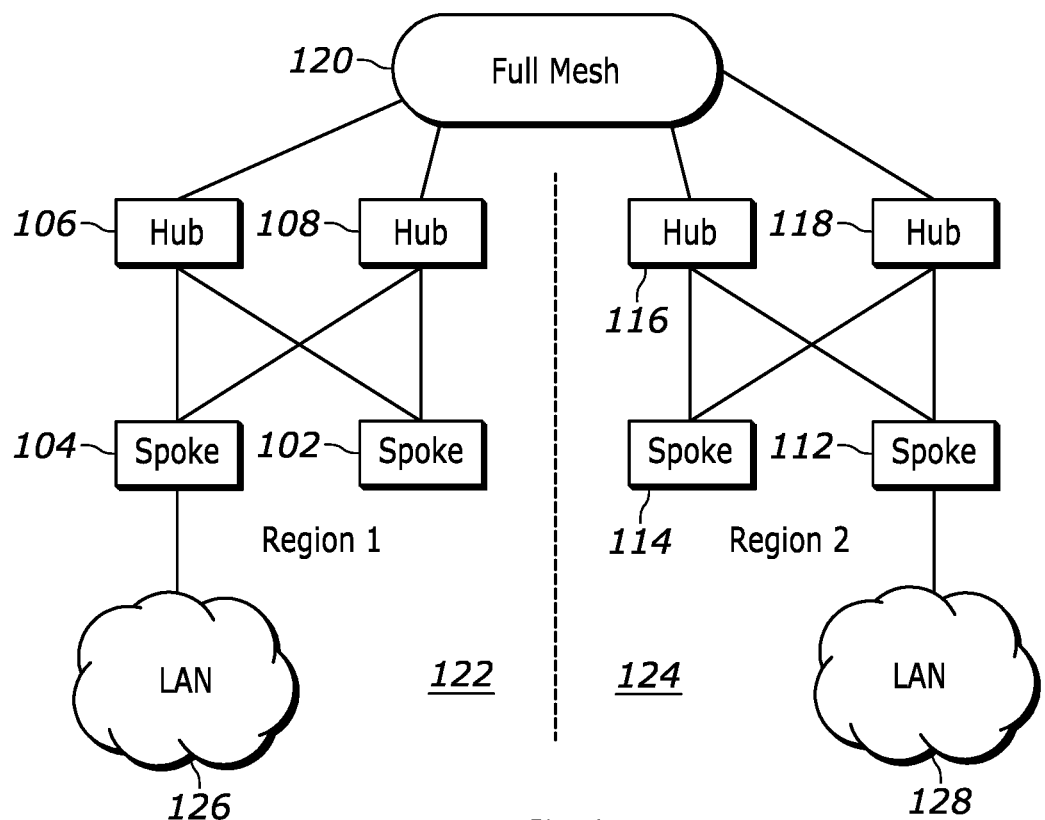
FIG. 1 is a diagram of a network with hubs and spokes in two different regions suitable for application of embodiments herein.

The embodiments herein and the various features and advantageous details thereof are explained more fully with reference to the non-limiting embodiments that are illustrated in the accompanying drawings and detailed in the following description.

Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose methods for path selection through multiple software-defined wide area network sites using path metrics. The selection may be end-to-end paths calculated using metrics on point-to-point overlay paths. The underlay paths may include the Internet, an intranet, a private LAN (Local Area Network), or through a cloud, such as a public cloud, a private cloud, and/or a hybrid cloud. Further, embodiments herein are described in the context of a Software Defined Wide Area Network (SD-WAN) where the overlay paths are between hub nodes, branch nodes, or spokes or a hybrid path between different types of nodes. However, one skilled in the relevant art will recognize, in light of the description herein, that embodiments disclosed herein can be applied in non-software-defined WANs and for applications hosted within the network, e.g., within a LAN.

SD-WAN (Software Defined Wide Area Network) overlay technology may be used to provide secure connectivity between multiple branches over discrete network transports such as MPLS (Multiple Protocol Label Switching), Broadband, LTE (Long Term Evolution), etc. An SD-WAN overlay works over multiple topologies such as Full Mesh, Hub-n-Spoke, Partial Mesh etc. Any two endpoints may be connected through multiple point-2-point connections in the SD-WAN network. Out-of-band Service Level Agreement (SLA) monitoring may be used to obtain Key Performance Indicator (KPI) or any other metrics for any path between any two sites in the network. Probes may be used as well as in-band loss monitoring to provide accurate KPI metrics for all paths between any two sites in an SD-WAN network. Although a direct path between any two sites may be used for connectivity between any two spokes, the direct path may not be the ideal path. A better path may be found by considering more of the KPI metrics such as delay, loss, jitter, etc. in forward and reverse directions.

A specific process at a control plane or data plane, for example an MP-BGP (Multiprotocol Border Gateway Protocol) control plane or data plane, may be used to announce SLA metrics from each site. The paths may be explored and evaluated, whether single-hop or multi-hop to reach a destination site. In this way, path metrics may be used to provide an optimal path for the data traffic. Typically, in Hub-n-Spoke environments Spoke-to-Spoke connectivity is via a Hub and alternate paths may be via other Hubs. However even in Partial Mesh environments, there may be alternate multi-hop paths which have a lower cost. The cost may be based on a cost function that considers delay, loss, jitter, etc. After evaluating all the paths between the two endpoints the control plane is able to program an ordered list of paths that traverse any number of transit SD-WAN nodes in the network.

FIG. 1 is a diagram of a network with hubs and spokes in two different regions. In the first region 122, a first spoke 102 and a second spoke 104 are each connected to a first hub 106 and a second hub 108. The hubs and spokes are connected in a full mesh, but any other connection system may be used. The two hubs are coupled to the full mesh 120 of the underlying network. In embodiments, both the first spoke 102 and the second spoke 104 are able to reach the network through either one of the two hubs, the first hub 106 and the second hub 108. Similarly, the second region 124 has a first spoke 112 and a second spoke 114 each connected to a first hub 116 and a second hub 118. The two hubs of the second region 124 provide connectivity to the full mesh 120 for the two spokes 112, 114 of the second region 124. While only two spokes are shown in each of two regions, there may be many more spokes, hubs, and regions in any actual network. The spokes may be coupled to terminals or nodes, directly, through connected local area networks, such as the first connected LAN 126 and the second connected LAN 128, or through any other communications device or network of devices.

An ordered list of paths between any two SD-WAN endpoints, such as the first spoke 102 of the first region 122 and the second spoke 114 of the second region 124 will include paths through different hubs and different hops through the full mesh. The control plane may evaluate and program a selected path to improve performance. The additional paths that are not selected provide redundancy and fault tolerance. Over time, various faults, for example an increase in latency or loss on a preferred path may be evaluated using out-of-band SLA KPI (Service Level Agreement-Key Performance Indicator) metrics. These may be updated and announced over an MP-BGP control plane using existing protocols and evaluated and reprogrammed at each node. In some instances, a fast rerouting to a secondary path is required to provide acceptable quality of service. Such instances include node failures, link failures, and sharp increases in latency, loss, or jitter through any link. As described herein, a fast re-routing system provides fast failover and optimal path convergence in the case of faults in the network.

As mentioned, the topology is divided into a first region 122 and a second region 124, each with two hubs (for redundancy) which serve their regional spokes. The hubs may be connected in a full mesh to provide connectivity within and across the two regions and the many other possible regions (not shown). Spokes communicate via hubs within and across regions. In one example, a spoke 104 in the first region provides path options to route a packet from a first connected LAN 126 to reach a second connected LAN 128 in the second region. Based on the flow-tuple, e.g., an IP (Internet Protocol) flow-tuple, a 5-tuple (source IP address/port number, destination IP address/port number, protocol), of the packet from the first connected LAN 126 in the first region 122, the connected second spoke 104 may be configured to load balance the traffic evenly across two paths, for example through the first hub 106 and the second hub 108. In some cases, evenly balancing the load provides a bad result. As an example, if a hub is congested, then any traffic on that path will be delayed. A more difficult example is if a hub is congested further along the path such as one of the first hub 116 and the second hub 118 in the second region 124. This information is typically not available to the second spoke 104, but may be worse than congestion at the next hop. As described herein by collecting the total end-to-end path metrics, a better path selection may be made.

Figure 2:
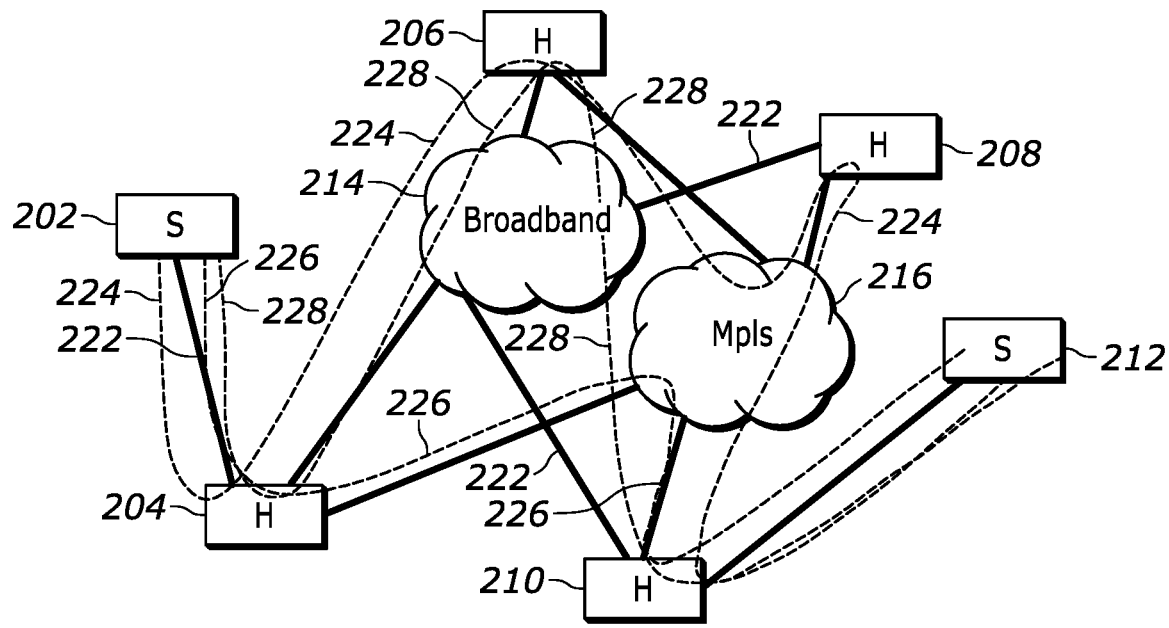
FIG. 2 is a diagram of possible paths for traffic flow between two nodes of a network, suitable for application of embodiments herein.

FIG. 2 is a diagram of possible paths for traffic flow between two nodes of a network. The source node or starting point node is a first spoke 202 in a first region and the second node is a second spoke 212 which may be in the same or a different region. The first spoke 202 and the second spoke 212 are connected through interconnected hubs. There is an underlay connectivity 222 of the network that may take many different forms.

For purposes of the present diagram, the first spoke 202 is connected only to a first hub 204. The second spoke 212 is connected only to a second hub 210. The hubs are each indirectly connected to each other hub through the full mesh of the network which includes a broadband backbone 214 and an MPLS backbone 216.

Three alternative routes are shown between the first spoke 202 and the second spoke 212. The first route 224 is from the first hub 204 to the two intermediate hubs 206, 208 and to the second hub 210. The second route 226 is from the first hub 204 directly to the second hub 210. The third route 228 is from the first hub 204 to the second hub 210 through only one of the two intermediate hubs 206. An evaluation of the path metrics and cost functions may be used to determine an ordering for the three paths. The paths may each be assigned a weight based on a cost function that is applied to the metrics gathered for each link on each path. The path selection, represented for example by a flow-tuple, may be done using the weights.

In some embodiments, the metrics or cost for each link between the hubs is applied to a table. Possible paths are weighted by combining values for each link in the path. If each link has the same quality, then the shortest path will be preferred. However, the collected metrics will indicate if a longer path is actually better than a shorter one. The existing site-to-site SLA monitoring results, between any two SD-WAN sites may be combined to calculate the performance of the entire path within an SD-WAN topology. The path may then be selected based on any configured constraints.

The computed paths may also be used to quickly reroute the traffic in the event of a node or link failure. The suitable paths may be ranked from best to worst and stored in a Forwarding Information Base. When the best path has a link failure or congestion event, then an indication of the link failure can be received at a forwarding node of the data plane or the controller in the control plane. A second path may then be selected in response to the link failure indication.

The first spoke 202 may spread traffic to different hubs to distribute the traffic load between the hubs. However, if, unknown to the spoke, a link between hubs is congested, then the traffic throughput will be reduced by selecting the congested link. If the hubs distribute loads between other hubs on the same basis, then there may still be a congested link in the path. In some embodiments, site-to-site SLA monitor data may be aggregated to determine costs of the virtual links that connect any two endpoints. This functionality may be advertised between endpoints using a MP-BGP or other protocol. The improved selected path may be used together with an SD-WAN policy to route traffic for a particular application that uses data exchanged through the path.

Figure 3:
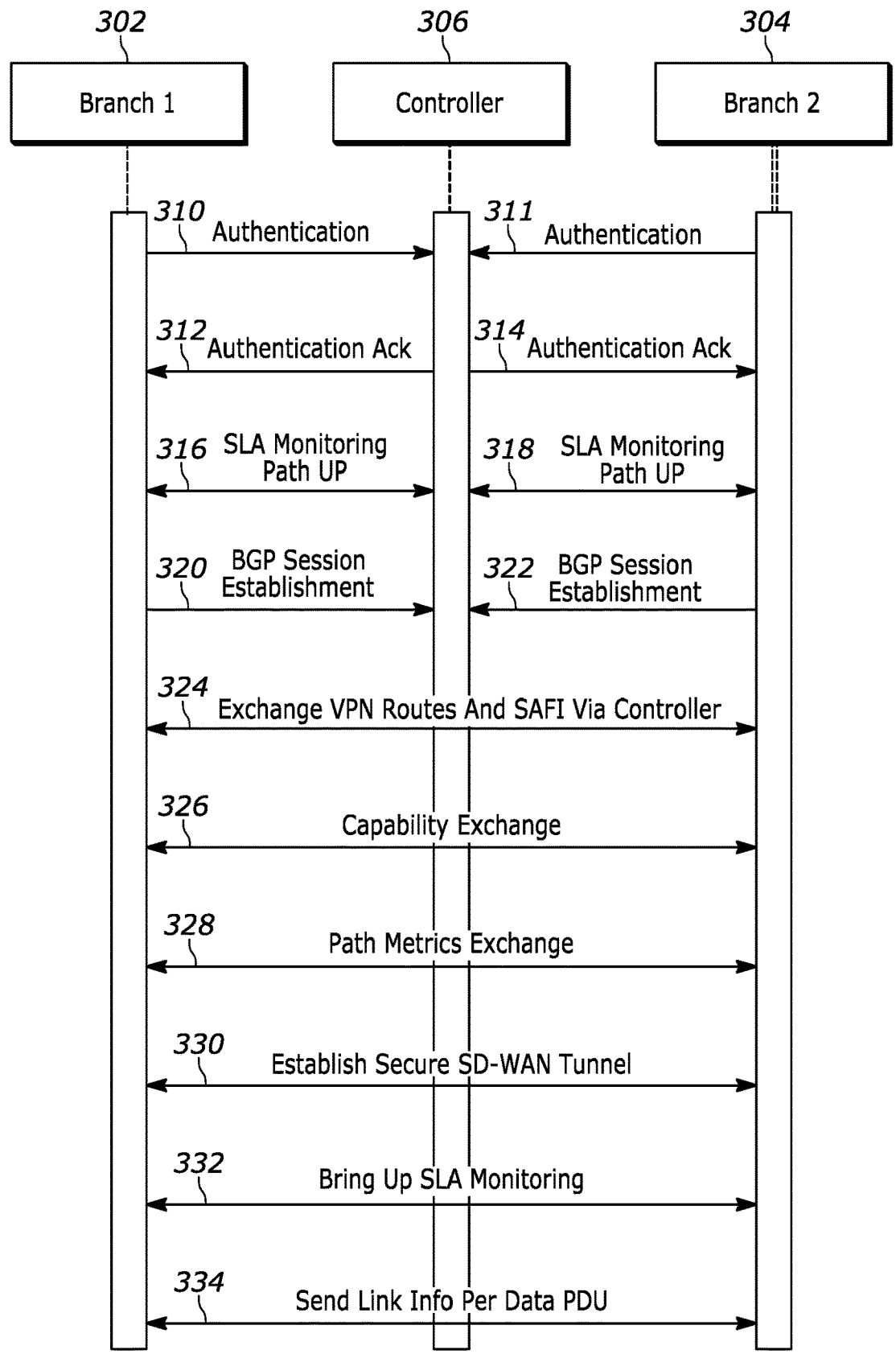
FIG. 3 is a message sequence diagram of establishing a path selection, according to embodiments herein.

FIG. 3 is a message sequence diagram of establishing an SD-WAN overlay and capabilities through a controller. Information may be collected to generate and maintain a site list at each branch. In embodiments, the site list contains a list of "nexthops" which include the relevant site and path. This information may be sent in data PDUs (Protocol Data Units) in, for example, Protocol Extension packets of various kinds. A capability exchange allows the controller to send and receive site-lists. It may also allow SD-WAN flow and other auxiliary information to be exchanged using TLVs (Type Length Values), AFI (Address Family Indicator), SAFI (Subsequent AFI), or other fields in MP-BGP messages.

As shown, a controller 306 is in communication with multiple branches, a first branch 302 and a second branch 304. Only two branches are shown but there may be many more. A first branch 302 sends an authentication request 310 to the controller 306 and a second branch 304 also sends an authentication request 311 to the controller 306. These requests may include key exchanges, policy exchanges, key management protocols and other information. The controller acknowledges the authentication with an acknowledgment message 312 to the first branch 302 and an acknowledgment message 314 to the second branch 304. Additional NAT (Network Address Translation) security parameters and payload configuration information may also be exchanged. SLA monitoring is configured as UP with a further message exchange 316 with the first branch 302 and a further message exchange 318 with the second branch 304. A session may then be established with session and connection establishment messages 320, 322 between the first branch 302 and the second branch 304.

The branches may then exchange virtual private network (VPN) routes, AFI, SAFI and other information at 324. In some embodiments, the controller 306, or the first and the second branch, e.g., the first branch 302 and the second branch 304 poll for traffic metrics. The metrics are received through the session which may include routes and capabilities. A capability exchange may be performed at 326 and a path metrics exchange is performed by the branches at 328. The capability exchange may include virtual LAN information, site lists, flow identifiers and other information. A secure tunnel may then be established at 330. Using the secure tunnel, SLA monitoring may be established at 332 and link information may be sent in respective data PDUs at 334. The link information provides a basis for scoring the links using SLA monitoring information or other link metrics. The branches may combine the received traffic metrics and calculate a performance of different possible paths from a source node to a destination node within the connected SD-WAN topology. Using this information, each branch 302, 304 is able to determine a path for any data sent by a respective branch.

Each SD-WAN site may participate in providing path metrics using a site identification and other identifying information in the topology. Each site is able to assess connected links, such as SD-LINKs using metrics, for example SLA measurements. These may include forward loss (FL), reverse loss (RL), FLR, RLR, FDV, RDV, forward delay (FD), reverse delay (RD), round trip time (RTT), among others. The metrics may be determined by the site for all or some of the links. In this way, there may be multiple sources of metrics for each link. These metrics may also be provided to the controller in response to probe messages.

A path is selected at every participating site or node. As an example, a shortest path tree (SPT) may be built using this information. In some embodiments, a Dijkstra algorithm may be used in which the link cost is the metric used to build the SPT. A metric range may be determined by applying constraints to the metrics. The constraints are configured to equalize the costs between paths that have similar metrics. In this way routes may be built that have similar metrics within the constraints.

Figure 4:
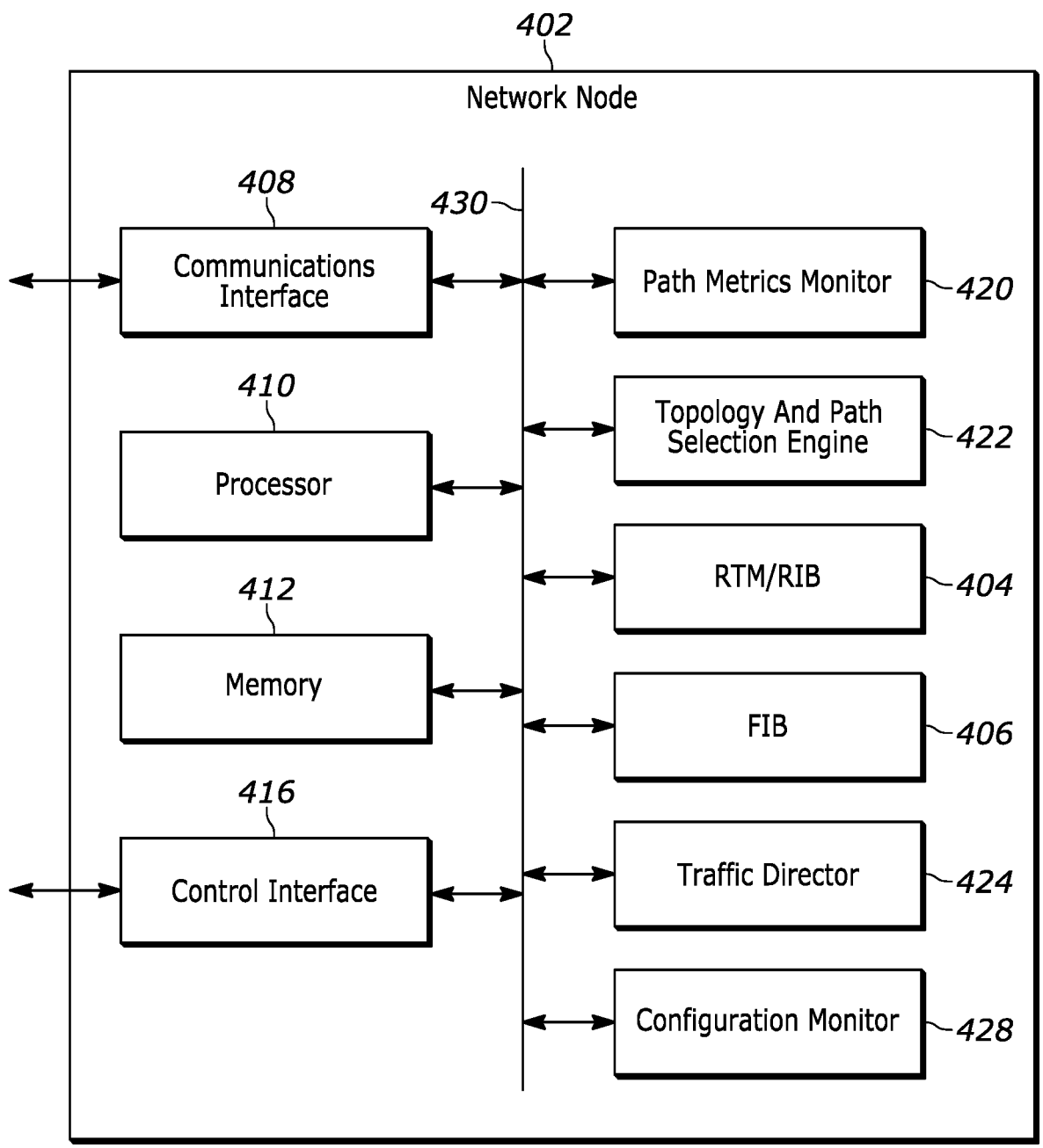
FIG. 4 is a block diagram of a node for selecting a path, according to embodiments herein.

FIG. 4 is a block diagram of a node 402 that operates in the control plane as a controller, branch or another function described herein. The node may be a branch node or a hub node, or another network node according to embodiments herein. The node includes a communications interface 408, a processor 410, and a memory 412 connected together through a bus 430. The processor 410 may include a multifunction processor and/or an application-specific processor. The memory 412 within the node may include, volatile and non-volatile memory for example, a non-transitory storage medium such as read only memory (ROM), flash memory, Random Access Memory (RAM), and a large capacity permanent storage device such as a hard disk drive. The communications interface 408 enables data communications with authentication, secure tunnels, SLA metrics, route exchange, and capability exchange etc., as described herein via local and wide area connections using one or more different protocols including BGP (Border Gateway Protocol) and separate private messaging. The node 402 executes computer readable instructions stored in the storage medium of the memory 412 to implement various tasks as described herein. The node 402 further includes a routing table manager with a routing information base (RTM/RIB) 404, a forwarding information base (FIB) 406 and various other traffic caches (e.g., application cache, domain application cache, client route cache, and application route cache) to store mapping information and other traffic communication data coupled to the bus 430.

A control interface 416 may be provided for node management and configuration purposes as an interface to a computer monitor or flat panel display but may include any output device. In addition, the control interface 416 may include an interface to a computer keyboard and/or pointing device such as a computer mouse, computer track pad, touch screen, etc., that allows a user to provide inputs and receive outputs including a GUI (graphical user interface). A GUI can be responsive to user inputs and typically displays images and data. The control interface 416 can be provided as a web page served via a communication to a remote device for display to a user and for receiving inputs from the user. Additionally, each of the modules may be implemented through instructions stored on a non-transitory computer-readable storage medium. The computer-readable instructions, e.g., program instructions, are executed on a physical processor of a computing system that supports the node The node 402 includes a topology and path selection engine 422 to poll and receive path metrics, such as SLA metrics, or Mean Opinion Score (MOS), for example, for voice traffic. For UDP (User Datagram Protocol)-based applications, various metrics, in combination with MOS or otherwise, can be used for path selection including but not limited to transaction times for UDP based protocols, a pre-defined metric such as apdex score (e.g., Application Performance Index, which is an open standard for measuring user satisfaction with response time of web applications), application specific metrics such as DNS (Domain Name System) response time (for DNS traffic), and user-defined metrics, among others The node 402 includes a topology and path selection engine 422 to perform path selection for DNS and data session traffic, and a traffic director 424 to publish selected paths. The node 402 further includes a configuration monitor 428 to monitor policy input including BGP/OSPF (Open Shortest Path First) updates, network interface state updates, and remote monitor updates, among others. The configuration monitor 428 generates alerts or interrupts and updates backup status when there are changes to any of the monitored network node state and configurations. The configuration monitor 428 may also maintain the RTM/RIB 404.

Considered in more detail, the path metrics monitor 420 obtains performance data for the various eligible paths through passive or active monitoring or a combination. Performance data may also be obtained from other nodes. Passive monitoring, in an example embodiment, involves collecting various transport layer (Layer 4 of the Open System Interconnect (OSI) model) as well as application layer (Layer 7 of the OSI model) metrics for Transmission Control Protocol (TCP)-based application sessions transiting the node and/or appliance. Passive monitoring can happen at both branch and hub nodes. The metrics can include, for example, at least link cost (minimum latency/minimum loss) and constraints configured by a user (latency-slack or hop-count-slack) network and server response times and packet loss estimates in each direction. This is sometimes referred to herein as a part of Equal-Cost, Multiple Path (ECMP) criteria, which may include latency tolerance (e.g., in milliseconds), loss tolerance (e.g., in percent) and hop tolerance (e.g., in number of hops). While calculating an end-to-end optimal path, two paths may have different but similar values. The ECMP criteria provide knobs to define how much slack can be tolerated to consider two different but similar cost paths as equal cost paths. In effect, the tolerances act as thresholds. When the value difference between two metrics is less than the threshold, then they are treated as being equal.

In an embodiment, active monitoring involves using active monitoring probes to measure responsiveness of applications. The active monitoring probes can be based on but not limited to ICMP (Internet Control Message Protocol), TCP (Transmission Control Protocol) or HTTP (Hyper Text Transfer Protocol)-based. For example, HTTP requests can be placed on the server of an application to understand the response performance of the application on a specific path. The active monitoring can be done at pre-configured intervals. Further, in various embodiments, the interval is dynamically configurable (for example, through a command line interface or a web interface on the node).

The topology and path selection engine 422 uses the metrics from the monitor to build the network topology and to compute host routes using the metrics. In some embodiments, the topology and path selection engine 422 is performing path calculations to generate routes from an SPT (Shortest Path Tree) build using local and remote SLA information. The calculated paths, referred to as host routes, are stored in the FIB (Forwarding Information Base) 406. The host routes contain reachability to every participating site via partial or complete end-to-end paths. In some embodiments, the topology and path selection engine 422 sends a parsed information list of forwarding-class (FC) sessions. In some embodiments, this is sent in a three-tuple or triplet format as <Nexthop, Path, FC>. The FIB applies the parsed information to the FC sessions on the list. The path selection may use traffic steering decisions based on the priority and reachability of the <Nexthop, Path, FC> tuples in the list. In cases where the FC is not the same as the incoming traffic, the nearest FC may be used. This may be the case, for example, when SLA monitoring is only configured for a subset of the Forwarding Classes.

The RTM/RIB 404 may be used to generate and store routes that are outside of host routes. A BGP configuration may be maintained to enable a Site-Of-Origin (SoO) knob. The SoO knob may be used to ensure that BGP adds a SoO-community designation to all the prefixes that it redistributes. The SoO community may include information about the ESP-IP (Encryption Security Protocol-Internet Protocol) address and site identifier (ID) of the appliance that is redistributing routes. In multi-hop topologies (like Spoke-Hub-Hub-Spoke), the SoO-community designation may be attached to the route to help determine the actual originator of a prefix. The SoO information (ESP-IP and Site-ID) may be maintained in the RIB.

The traffic director 424 manages the FIB and exports the best SLA metrics (collected to reach all connected sites) at configured export intervals. The intervals may be determined based on a timing threshold a schedule or based on a change that exceeds a threshold. In some embodiments, the SLA metrics are packed in private messages by the traffic director and advertised via BGP to remote-sites. The traffic director 424 may also direct the routing of each incoming packet under a session. The traffic director or the configuration monitor 428 may maintain the RIB or the RIB may be maintained independently by the RTM/RIB 404.

The embodiments disclosed herein can be implemented through at least one software program running on at least one hardware device and performing network management functions to control the network elements. The network elements shown in FIG. 1 include blocks which can be at least one of a hardware device, or a combination of a hardware device and a software module. It is understood that the scope of the protection for systems and methods disclosed herein is extended to such a program and in addition to a computer readable medium having a message therein, such computer readable storage medium contain program code means for implementation of one or more steps of the method, when the program runs on a server or mobile device or any suitable programmable device.

In an embodiment, the functionality described above is performed by a computer device that executes computer readable instructions (software). Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

There may be various candidates for the best path to any particular SD-WAN network node including but not limited to a direct connection from a branch, or through another node deployed as a cloud interconnection hub. Such hubs may be deployed in a variety of locations, for example, a third-party data center, an Internet interconnection, a hosting facility, or the data center of an application provider. Branches can be configured using single or multiple broadband circuits connected directly to the branch nodes, hub nodes, and spokes. Multiple paths may be stored in the FIB with a rank or ordering and as equal cost alternatives.

Typically, for available paths between any two nodes in a network, the performance of the paths can be monitored using active or passive monitoring techniques. Active monitoring involves injecting test packets into the network environment through the various paths and measuring performance based on standard performance parameters. Passive monitoring involves monitoring network traffic data over a period of time to understand the performance of different paths. A metric is derived based on the performance and is compared for different available paths to choose the best path.

As networks become more dynamic in nature, monitoring may be used to track changing conditions in the network. Furthermore, as networks become more complex and dynamic, the mechanisms for traffic monitoring and conditioning must be adaptable to changing conditions in the network as well. For example, an indication may be received directly or through polling that a link has failed. The FIB may then be used to select a secondary path. For another example, in enterprise-wide WAN networks, particularly those that are software defined (e.g., Software-Defined Wide Area Network (SD-WAN)), the configuration of the network can change from time to time depending on the network policies. The monitoring and path selection criteria may be adapted to changes accordingly. Still further, the mechanisms for performance-based path selection may be made applicable to paths hosted outside of the network. For example, in an SD-WAN network, path selection mechanisms may be applied to Internet-hosted applications, sometimes referred to as Software as a Service (SaaS) applications.

Figure 5:
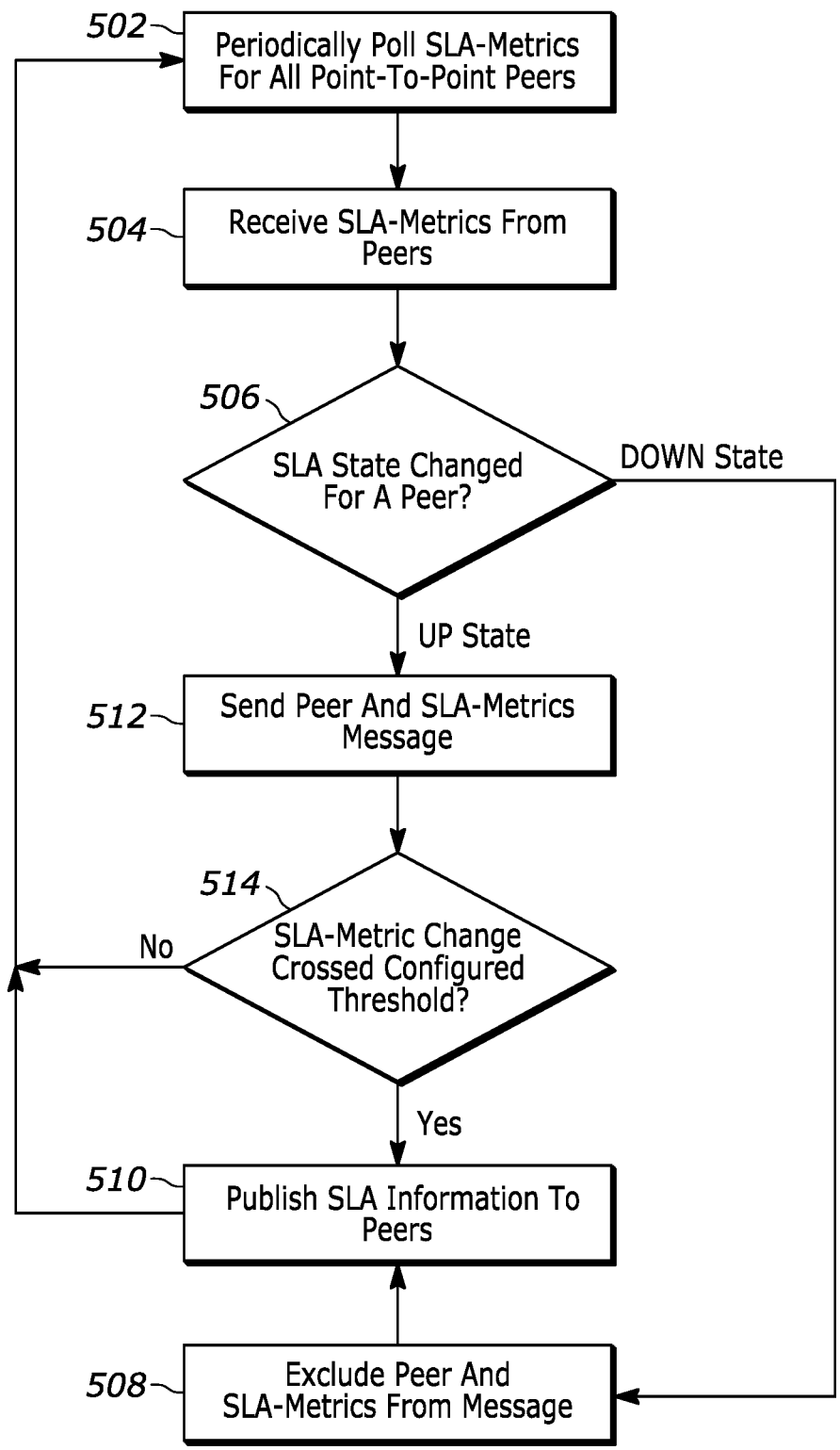
FIG. 5 is a process flow diagram of collecting path performance metrics, according to embodiments herein.

FIG. 5 is a process flow diagram of collecting path performance metrics by polling. The metrics may be used to select a path from a source node to a destination node. At 502 point-to-point (P2P) peers are polled periodically by a traffic monitoring module of a control plane for SLA metrics. Any other suitable metrics may be used to suit the configuration and topology of the network. At 504, SLA metrics are received from peers in response to the polls. At 506, the received metrics are compared to stored metrics to determine whether there is a change in the SLA state. This test may be performed separately for each peer. At 508 if the SLA state has changed DOWN, i.e., the performance is lower, then at 508 the messages published by the node at 510 will exclude the SLA metrics that were discovered by polling. In some embodiments, this message is in the form of a custom SLA information TLV (Tag Length Value) that excludes the peer and SLA metrics. At 510, this message is published to the peers and to a path selection engine without the peer and SLA metrics information.

At 506 if the SLA state has changed UP, i.e., the performance is higher, then at 512 the message is adjusted to include the peer and SLA metrics in, for example, the custom SLA information TLV. At 510, the message is published to the peers and the path selection engine with the peer and SLA metrics information. Decision box 514 receives the input from the Send Peer and SLA-Metrics Message box 512. The decision box 514 has a yes answer branch to box 510 if the result of SLA-Metric Change Configured Threshold? is Yes. The decision box 514 has a no answer branch that is a return to box 502 if the result of SLA-Metric Change Crossed Configured Threshold? is No. After publishing the message, the process returns to 502 for the next poll of P2P peers.

In some embodiments, including that shown in FIG. 3, every participating SD-WAN site receives the poll and responds through an encrypted tunnel between the traffic monitoring module and the respective peer. The peer advertises its link cost and list of SD-WAN neighbors to which it has a direct P2P connection. Each site may be identified by a unique ESP-IP (Encapsulating Security Protocol-Internet Protocol) address and a site ID. The reported metrics may indicate a link ID to identify the link for which the reported metrics apply. The SLA metrics may be configured in advance or indicated by the traffic monitoring module in the poll or in another message. The SLA measurements may be provided each for a single link so that links are more easily compared. These measurements are all combined to build a topology of the SD-WAN network and apply the SLA metrics to each link established in the topology.

Figure 6:
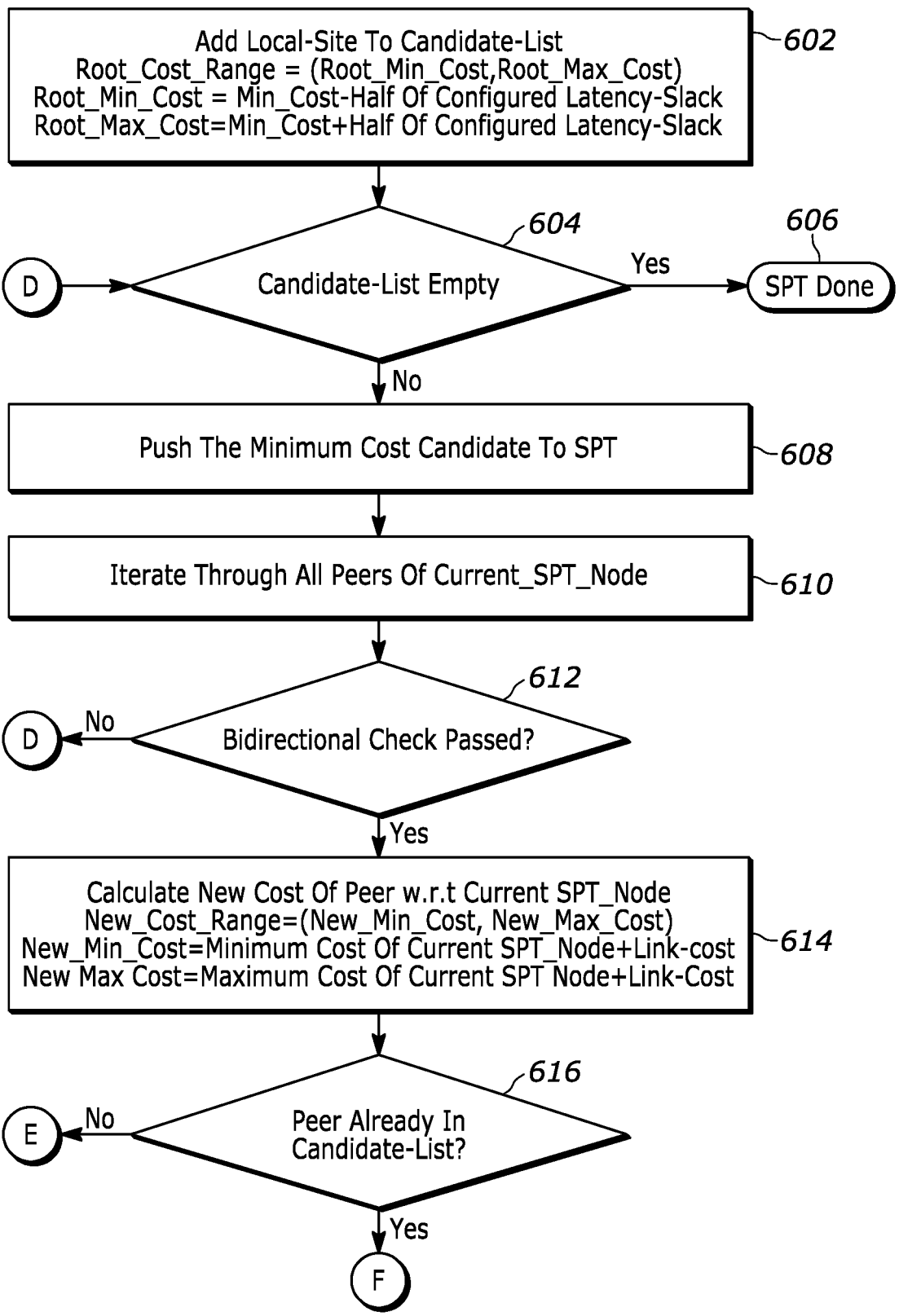
FIG. 6 is a process flow diagram of selecting a path, according to embodiments herein.
Figure 6:
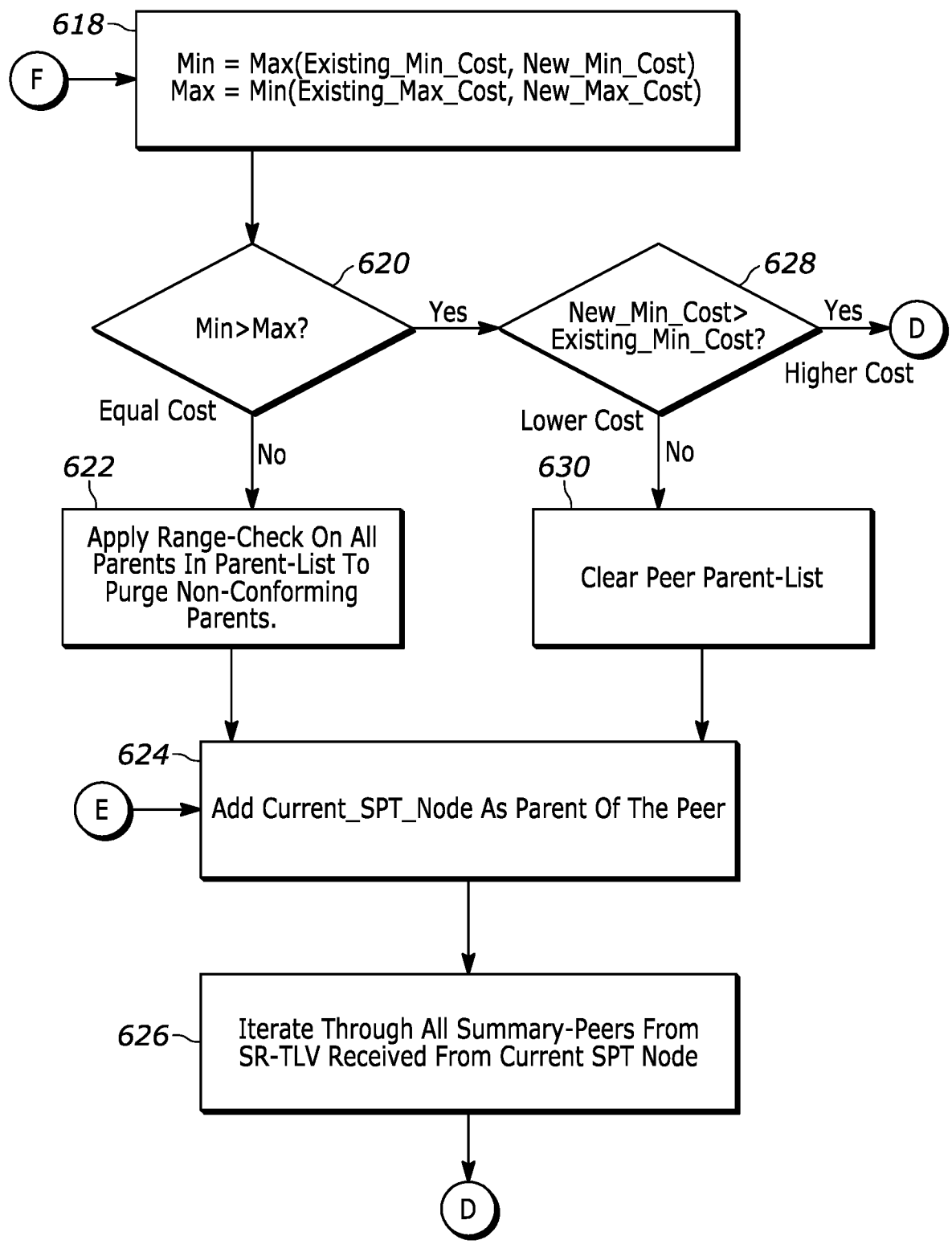

FIG. 6 is a process flow diagram of selecting a path using the collected topology and metrics as described above. Using the local SLA measurements and the information received from the polling from all of the sites, a shortest path tree (SPT) is built using the local site as the root node. In some embodiments, the poll responses may be in the form of SI-TLVs (SLA-Information Tag Length Values). An SI-TLV may be configured to contain SLA metrics only for point-to-point peers of each site. In some embodiments, additional information may be received for sites that are more than one hop away, e.g., in the form of SR-TLVs (Summary Route Tag Length Values). This additional information is particularly useful in scenarios in which SI-TLVs may be suppressed, e.g., due to autonomous system boundaries or summarization at a hub. In some embodiments, a Dijkstra algorithm with the link cost as the metric is used to build the SPT. The metric range for the link cost may be determined from a set of knobs that may be configured by an administrator or manager. In some embodiments, the knobs may be configured as ECMP (Equal-Cost Multi-Path) options. These options define how much variation may be tolerated in a cost measure in order to still consider the paths as equal cost paths. As an example, a latency tolerance may be set as the number of milliseconds of latency allowed between two measurements for the measurements to be considered as equal. As another example, a loss tolerance may be set as the percentage difference allowed between two measurements to be considered as equal.

The SPT determination, regardless of how it is determined, builds routes with similar performance metrics. In some embodiments, the SPT routes are based on a maximum threshold difference and, in some embodiments, a maximum hop difference. The result may be an SPT which holds all of the nodes in the path. A candidate list may also temporarily hold all of the potential nodes with the best cost during the path computation.

At 602, a local site is added to the candidate path list. The local site is the root node from which the shortest path is calculated to every other participating remote site. The cost is initialized as root costs with a minimum and a maximum root cost as follows:

> root_cost_range=(root_min_cost, root_max_cost)
>
> root_min_cost=MIN_COST−half of configured latency-slack
>
> root_max_cost=MIN_COST+half of configured latency-slack From the root node, the cost is determined to each candidate peer node of the root node. As each candidate peer node is being evaluated, it is referred to as the current SPT node. The process cycles through each candidate peer node until the candidate list is emptied. At 604, if the candidate list is empty then the SPT calculations are finished at 606 and the candidate with the lowest cost is selected for the SPT path. If not, then at 608 the minimum cost candidate peer node is selected from the candidate list to become the current SPT node.

At 610 the comparison iterates through all of the peers of the current SPT node. At 612 a bi-directional check is applied to all of the peers in the iteration at 610. In some embodiments, bidirectional connectivity can be checked by checking if each peer has advertised the each other node as its neighbor. In the messaging described above, the messaging may be in an SLA information TLV through a secure tunnel with the control plane. If the bidirectional check is not passed at 612, then the process returns to 604 to determine if there are any more candidate peers. If there are then the next minimum cost candidate is pushed to the SPT path selection.

For those peers with bidirectional connectivity to the root node, the cost of the link to the current SPT node may be calculated with respect to the root node at 614.

> new_cost_range=(new_min_cost, new_max_cost)
>
> new_min_cost=minimum cost of current_SPT_node+ link-cost
>
> new_max_cost=maximum cost of current-_SPT_node+link-cost At 616, the current SPT node may then be added to the candidate list of peers of the root node. If the current SPT node is not already in the list, then the current SPT node is added and at 624 the current SPT node is added as a parent of the peer and the cost range determined at 614 is set as the new cost range for the peer.

If the current SPT node is already added to the candidate list, then the cost range of the current SPT node is compared at 618. The comparison may be expressed as:

> min=MAX(existing_min_cost, new_min_cost)
>
> max=MIN(existing_max_cost, new_max_cost)

At 620 if the min is greater than the max as determined at 618, and the new min cost is greater than the existing min cost as determined from 618, then the cost for the new peer candidate is higher than existing candidates and the candidate is ignored. The process returns to 604 to determine if there are any other candidate peers in the candidate list.

On the other hand, if min is greater than max at 620 and new min cost is less than the existing min cost at 628, all as determined at 618, then the new cost for this new peer is lower than for the previous peers. All the previous paths may be ignored so that the existing peer parent list is cleared at 630 and the current SPT node is added as the parent of the peer at 624.

In addition, if the min is less than the max, then the current SPT node is added to the peer parent list because the cost for his peer is equal to that of the current best candidate. The costs are equal in that they are within the allowed ranges of differences, expressed for example by an ECMP or by other thresholds, tolerances, or slack in the ranges. At 622 a range check is applied on all of the parents in a list of parents to purge any parents that are not within the current best range. The range intersection check ensures that all of the paths that have been calculated and added to the list are within the configured slack. At 624, the current SPT node is added as a parent of the peer.

At 626, after the current SPT node is added as the parent of the peer, all the summary peers from the current SPT node are pushed to the candidate list, updating the parent list. The peers may be identified from SR-TLV (Summary Route-TLV) messages sent through a secure tunnel to the traffic monitor by the respective peer. Summary information may be added to the candidate list. This helps to improve the selected paths. As an example, when reachability to a same remote-site is announced by multiple peers, the SPT decision may be made with better path information that may reduce the end-to-end latency.

With the parent and peer candidate list completed with summary information for routes within the range check at 626, the process returns to 604 to determine whether there are any further candidates. If not then at 606, the SPT decision is made. A host route is created for each node in the SPF using the parent list to calculate the nexthop list of all the possible routes. These routes are added to the FIB of the control plane for use in directing packets.

Figure 7:
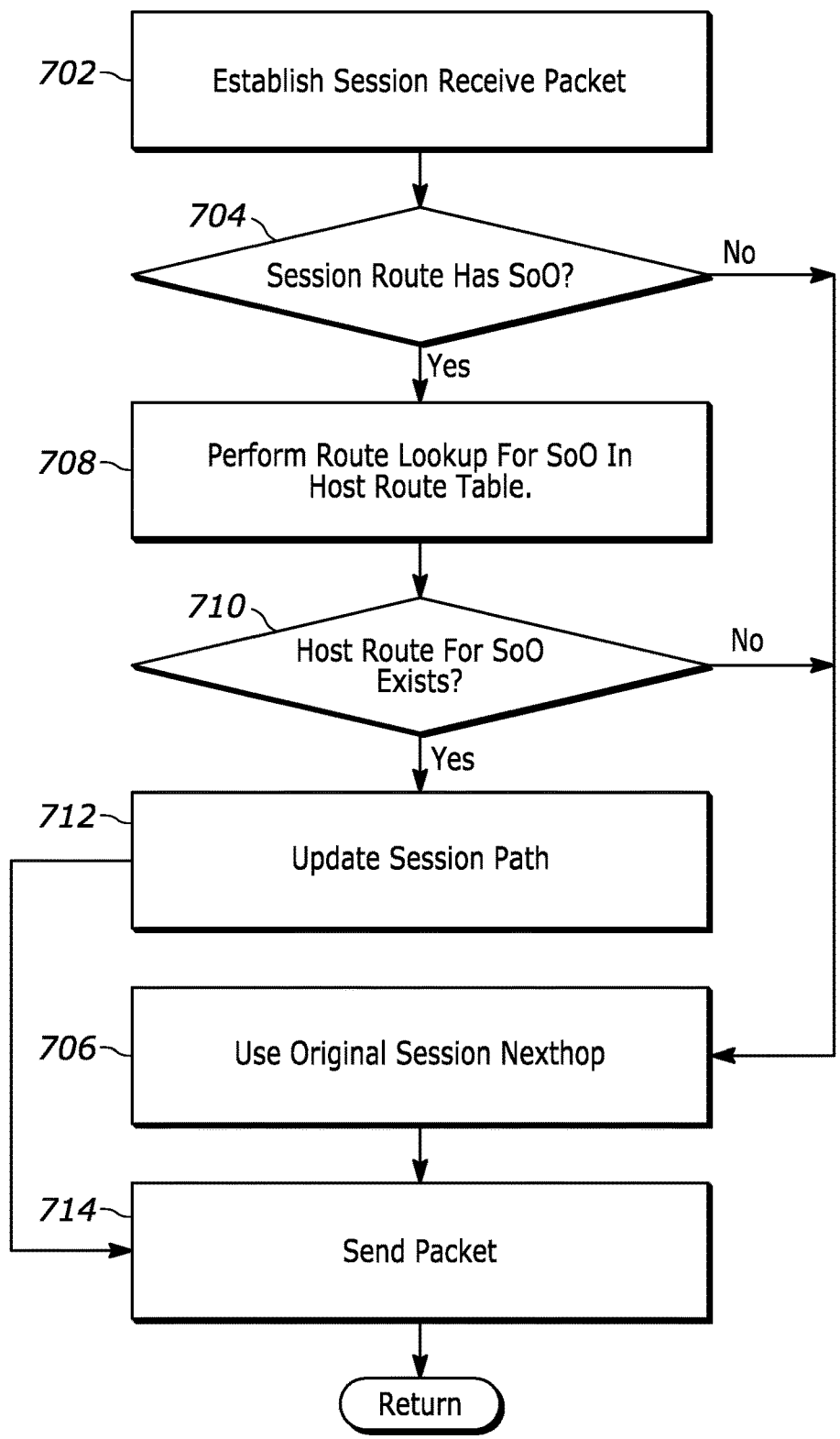
FIG. 7 is a process flow diagram of sending a packet on a selected path, according to embodiments herein.

FIG. 7 is a process flow diagram of routing packets during a session using the selected path as stored in a host route table. In some embodiments, the host route table is stored in the FIB (Forwarding Information Base) of the controller or a node such as in FIG. 4. At 702 a session is established and a packet is received. In some embodiments, the session includes authentication, IP SEC (Internet Protocol Security) parameters and a secure tunnel but these are not required. In some embodiments, sessions are created for every flow received by the appliance based on the flow's unique 5-tuple (source IP address/port number, destination IP address/port number, protocol).

For each session, a route lookup is performed based on the destination IP address of the 5-tuple. This lookup starts at 704 with determining if the route associated with the session has a SoO (Site of Origin). The SoO may be announced by the prefix redistributing router and it uniquely identifies the source of the route. If there is no such SoO, then at 706 the original session nexthop is used to send the packet toward the destination IP address. The nexthop may come from an Routing Information Base (RIB) as is done with current routing protocols.

If the session route has an SoO, then at 708 a route lookup is performed for the SoO in a host route table. The lookup may be stored as part of the session or in another location and provides improved end-to-end paths determined using SLA or other metrics as described above. At 710 if such a host route is found during the lookup at 708, then at 712 the session path is updated using the host route. The host route path is used to route the packet at 714 instead of the nexthop route at 706 from the initial destination route lookup in the RIB. However, if the host route is not found at 708, then from the decision at 710 the packet is routed at 714 using the original session nexthop at 706.

The embodiments disclosed herein can be implemented through at least one software program running on at least one hardware device and performing network management functions to control the network elements. The network elements shown in FIGS. 1 to 4 include blocks which can be at least one of a hardware device, or a combination of a hardware device and a software module.

Figure 8:
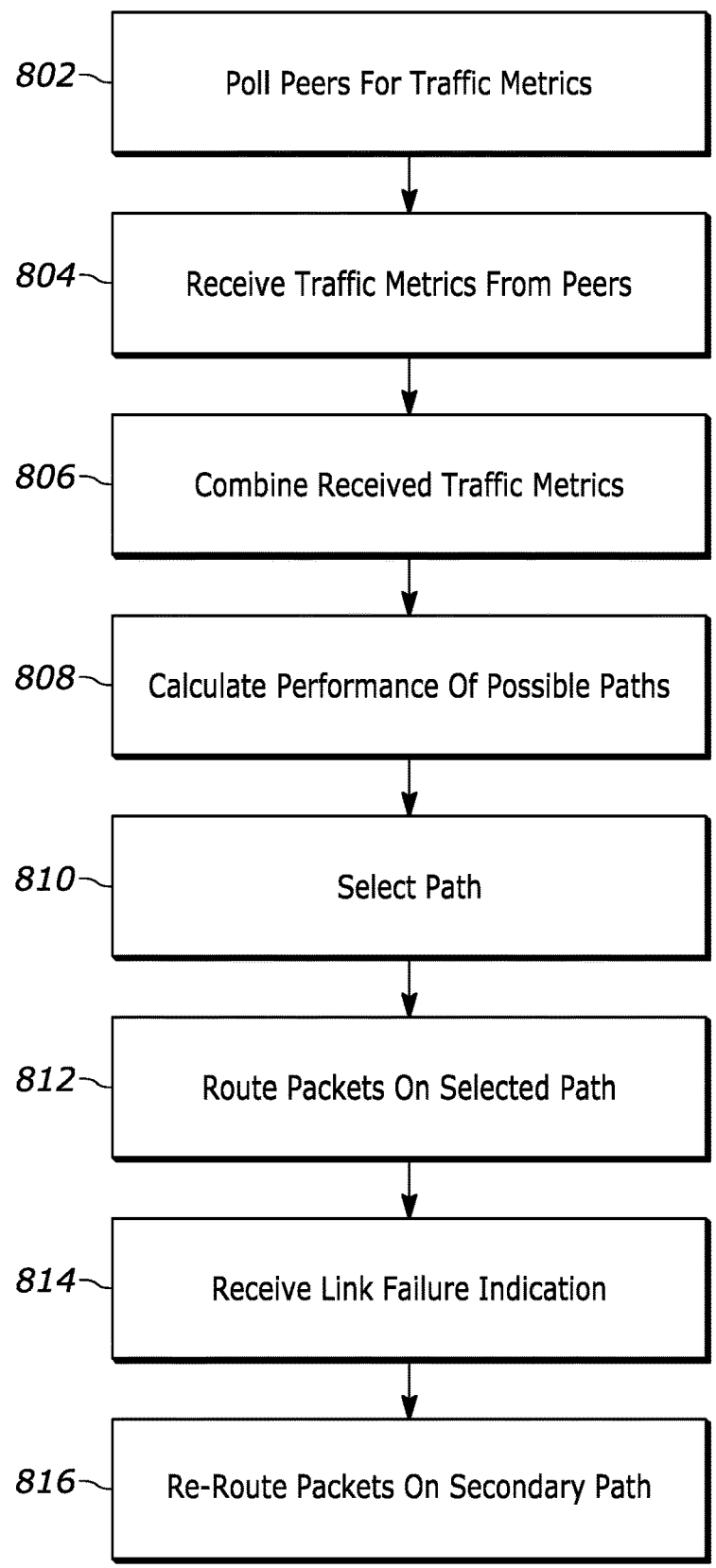
FIG. 8 is a process flow diagram of selecting a path for data traffic according to embodiments herein.

FIG. 8 is a process flow diagram of selecting and implementing a path for data traffic from a source node to a destination node within an SD-WAN to show a combination of FIGS. 5, 6, and 7 in a simplified form. At 802 a controller in a control plan polls peers for traffic metrics. At 804 traffic metrics are received from at least a portion of the peers. The traffic metrics may be SLA metrics and may include path latency, packet loss, or both or other metrics. The traffic metrics may be existing site-to-site monitoring collected by point-to-point peers independent of receiving a poll. These metrics may come from SLA monitoring at the peers.

At 806, the received traffic metrics are combined. At 808 the performance of multiple possible paths is calculated. Performance may be calculated by applying the received traffic metrics to thresholds to select those with metric values that are better than the threshold. In some embodiments, a Dijkstra algorithm of thresholds with weight ranges is used. The Dijkstra algorithm may be performed by punching in configured weight ranges in SPF runs. Referring to FIG. 6, a candidate for each hop of a candidate path is considered and the traffic metrics for the respective hop is compared to the cost range for each run until the best hop or link is selected at each node. In other words, traffic metrics for each hop of a candidate path are compared to a cost range for other candidate paths to find the lowest cost path.

At 810 a path is selected from the source node to the destination node based on the calculated performance. The selected path may be the path with the lowest path latency. The path may be selected by applying path routing constraints as provided, for example, by the thresholds. At 812 packets are routed along the selected path. The control plane may direct values to the data plane, for example to selected hubs to be used in determining the path from that hub to other nodes. The values indicating the path may be sent using BGP policies. In some embodiments, a list of Spoke-Hub-Hub-Spoke (SHHS) paths are sent from the control plane to a plurality of spokes and the data plane selects a path using the list of SHHS paths.

At 814 a link failure indication or other transmission issue is received. This indication may be received in the data plane or the control plane. At 816, packets are re-routed to a second path in response to the link failure indication. The FIB or RIB may contain multiple alternative paths with or without a ranking. This allows for a fast re-routing of packets in the event of a link failure.

Figure 9:
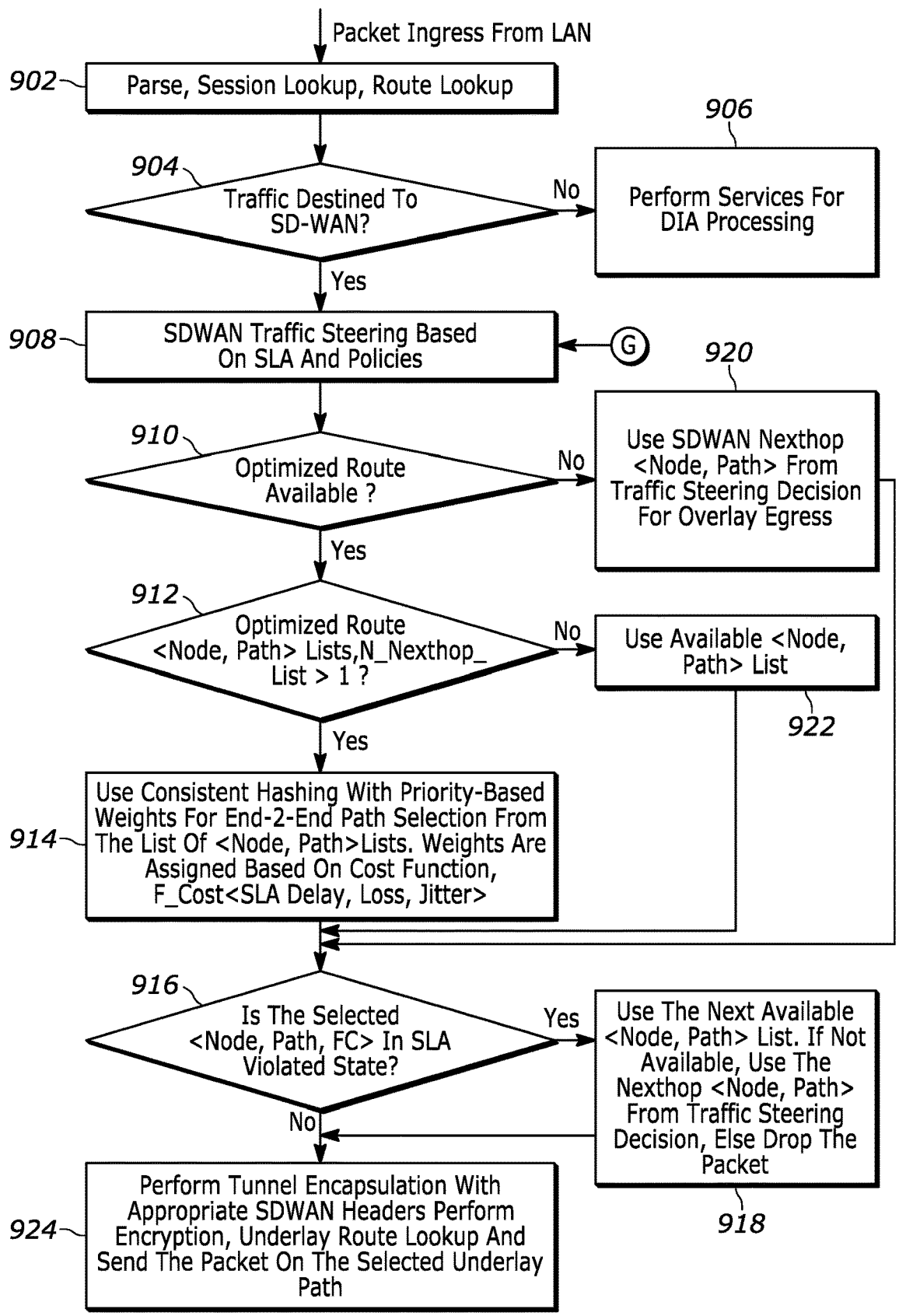
FIG. 9 is a process flow diagram of packet processing at an originating node according to embodiments herein.

FIG. 9 is a process flow diagram of packet processing at an originating node using the route selection as described herein. At 902, a packet comes into an originating node from a LAN or other connected node. The packet ingress is through a session and the packet includes routing information, e.g., a 5-tuple. The node parses the session and the 5-tuple and looks up a route for the packet from the node to its destination. At 904, the node determines whether the incoming packet is destined to the SD-WAN, i.e., whether the destination IP address is outside of the LAN and reachable through an attached SD-WAN. If not, then at 906, the node performs other processing services to send the packet to a destination outside of the SD-WAN, e.g., DIA (Dedicated Internet Access) processing.

If the destination IP address is within or accessible through the SD-WAN, then at 908, the packet steering starts based on SLA and policies for routing the packet. First at 910 the node determines whether an optimized route is available for the packet. The optimized route is a route selected using combined traffic metrics as discussed above. If there is no optimized route available at 910, then at 920 a standard overlay path is used at 920. The SD-WAN nexthop which includes node and path that come from a traffic steering decision is used for the egress of the packet on an overlay path. At 916, the selected nexthop parameters, such as node, path, FC are tested to ensure that the nexthop is not in an SLA violated state and, if not, then the packet is sent at 924 in accordance with the overlay egress. As shown, this includes performing tunnel encapsulation with appropriate SD-WAN headers, performing encryption, performing underlay route lookup, and then sending the packet on the selected underlay path.

When an optimized route is available at 910, then the route is tested at 912. When the optimized route, including node and path lists less than one node in the nexthop list, then at 922 the available node, path in the list for the corresponding underlay path are used. The route is then tested to ensure no SLA violations at 916 and sent on the selected underlay path at 924.

On the other hand, if at 912, the optimized route node and path lists include more than one nexthop, then at 914, a selection is made for another optimized route. This selection process, as described in more detail above, involves using consistent hashing with priority-based weights for end-to-end path selection from a list of underlay paths with node and path lists. The weights are assigned based on cost functions such as SLA delay, loss, and jitter. The newly selected underlay path is then tested to ensure that the selected parameters including node, path, and FC are not in an SLA violated state at 916 and if not, then the packet is sent on the underlay path at 924.

If, any of the paths are in an SLA violated state at 916, then a new path is selected at 918. The next path is selected from a list. If there is no available next optimized list, then new parameters are selected using a traffic steering decision. These lists may include node and path lists. If a new path may be chosen from the lists, then the packet is sent at 924. If there is no available path, then the packet is dropped. In some implementations a packet source is notified that the packet was not sent.

Figure 10:
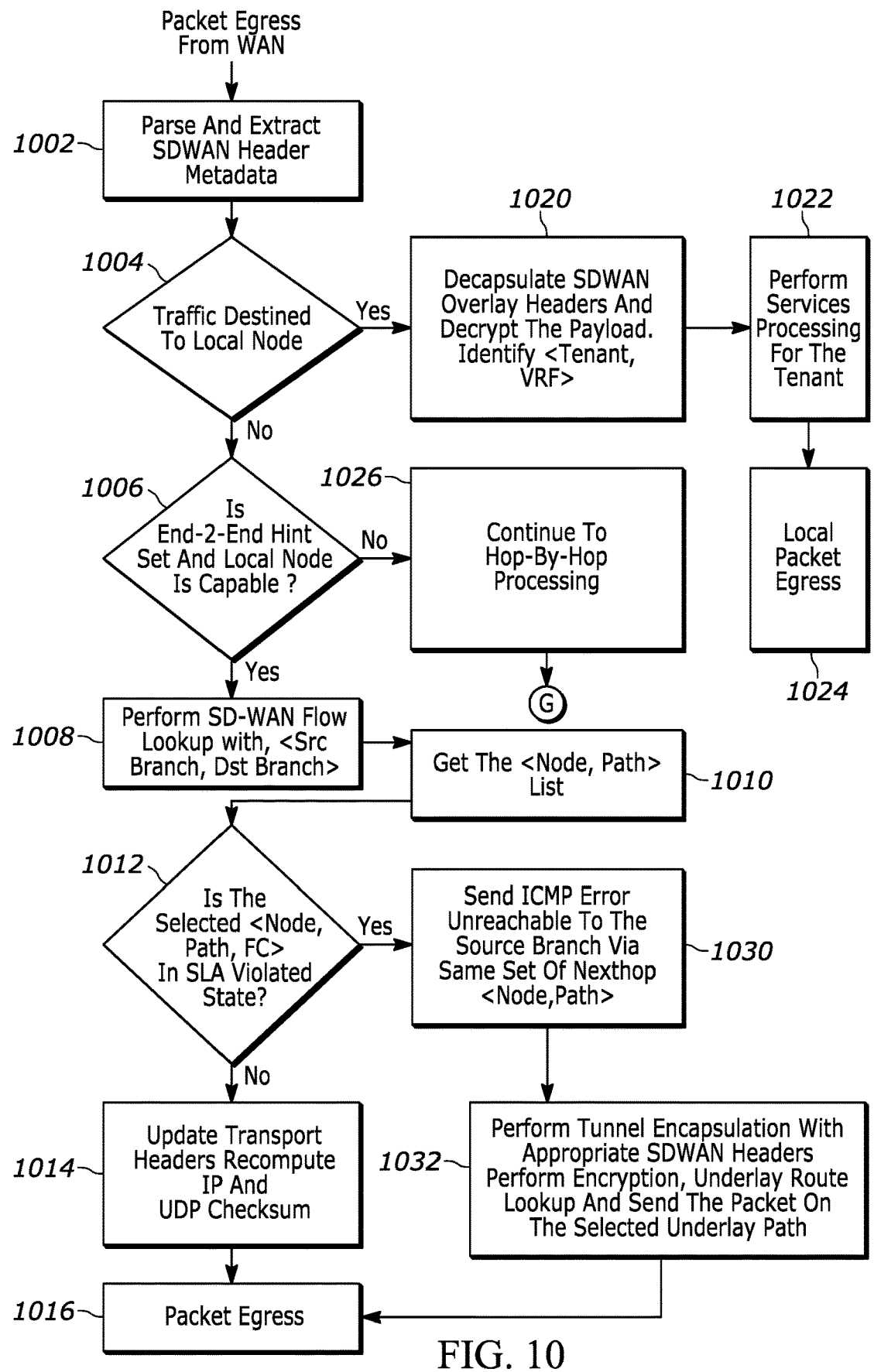
FIG. 10 is a process flow diagram of packet processing at a transit node according to embodiments herein.

FIG. 10 is a process flow diagram of packet processing at a transit node using the route selection as described herein. At 1002, an ingress packet is received at a transit node from a WAN. The SD-WAN header metadata is extracted and parsed. At 1004 if the packet is destined to a local node, in which case, the transit node is serving as a local ingress node, not a transit node, then at 1020 the SD-WAN overlay headers are decapsulated, the payload is decrypted and the tenant and VRF (Virtual Routing and Forwarding) are identified. At 1022 processing services are performed for the identified tenant and at 1024, the packet is sent to the tenant. The transit node performs local packet egress at 1022 directly or through another node.

If the packet is not destined for a local node at 1004, then at 1006, the transit node examines a hint set of the metadata and determines whether the transit node is capable of optimizing the routing. If not, then at 1026, the processing goes to hop-by-hop processing. From the hop-by-hop processing, the process returns to SD-WAN traffic steering based on the SLA and policies at 908.

If the transit node is capable, then at 1008, the node does a flow lookup in a host route table using the source branch and destination branch and any other suitable information. Upon finding a path, the node and path are retrieved at 1010. This is the full information necessary to route the packet to the next node so at 1012 a check is made wither the node, path, or FC are in an SLA violated state and if not then at 1014, the transport headers are updated, the IP and UDP checksum are recomputed and other packet processing operations are performed. At 1016 the packet egresses the transit node to the next node, e.g., nexthop node.

If any of the node, path, and FC are in an SLA violated state at 1012, then a new path is determined. At 1030 an ICMP (Internet Control Message Protocol) error message may be sent to the source branch back through the same route from which the message came at 1002. At 1032, the packet may be processed for the new route with operations such as tunnel encapsulation using appropriate SD-WAN headers, tunnel encryption, underlay route lookup and other operations. The packet may then be sent on the newly selected underlay path and egresses at 1016.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or any combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

The computer readable media may comprise, for example, RAM contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine-readable storage media, such as a direct access storage device (DASD) storage (e.g., a conventional "hard drive" or a redundant array of independent drives RAID array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method to select a route for data traffic within a software-defined wide area network (SD-WAN) topology, the method comprising:
    receiving, at a branch node, Service Level Agreement (SLA) metrics of links between sites in the SD-WAN topology from at least a portion of the peers of the branch node, the SLA metrics received out-of-band in protocol extension packets through secure tunnels of the SD-WAN topology;

receiving a packet at the branch node in an established session, the packet having a source node and a destination node;

calculating performance of a plurality of possible paths from the source node to the destination node by combining SLA metrics for each link in the respective path, the source node and the destination node being within the SD-WAN topology; and selecting a path at the branch node for the received packet from the source node to the destination node based on the calculated performance.

2. The method of claim 1, wherein the received traffic metrics comprise existing site-to-site monitoring collected by point-to-point peers independent of receiving a poll.

3. The method of claim 2, wherein the site-to-site monitoring comprises Service Level Agreement (SLA) monitoring.

4. The method of claim 1, wherein calculating performance comprises performing path calculations by applying the received traffic metrics to thresholds.

5. The method of claim 4, wherein the thresholds provide a value difference within which two paths are considered to be equal.

6. The method of claim 4, wherein performing path calculations comprises using a Dijkstra Algorithm of thresholds with weight ranges.

7. The method of claim 6, wherein using the Dijkstra algorithm comprises performing the Dijkstra Algorithm by punching in configured weight ranges in Shortest Path First (SPF) runs.

8. The method of claim 1, wherein selecting the path comprises comparing traffic metrics for links of a candidate path to a cost range for other candidate paths.

9. The method of claim 1, wherein the traffic metrics represent at least one of path latency and packet loss.

10. The method of claim 9, wherein selecting the path comprises selecting the path having a lowest path latency.

11. The method of claim 1, wherein selecting the path comprises applying path routing constraints.

12. The method of claim 1, further comprising receiving an indication of a link failure in the selected path, the method further comprising selecting a second path from the source node to the destination node in response to the received link failure indication.

13. The method of claim 1, wherein selecting the path comprises selecting the path at a control plane, the method further comprising sending the selected path to a data plane of the SD-WAN topology.

14. The method of claim 13, further comprising the data plane receiving a list of Spoke-Hub-Hub-Spoke (SHHS) paths from a plurality of spokes and the data plane selecting the path using the list of SHHS paths.

15. A non-transitory computer-readable storage medium containing program instructions, wherein execution of the program instructions by the computer causes the computer to perform operations comprising:

receiving, at a branch node, Service Level Agreement (SLA) metrics of links between sites in the SD-WAN topology from at least a portion of the peers of the branch node, the SLA metrics received out-of-band in protocol extension packets through secure tunnels of the SD-WAN topology;

receiving a packet at the branch node in an established session, the packet having a source node and a destination node;

calculating performance of a plurality of possible paths from the source node to the destination node by combining SLA metrics for each link in the respective path, the source node and the destination node being within the SD-WAN topology; and selecting a path at the branch node for the received packet from the source node to the destination node based on the calculated performance.

16. The medium of claim 15, wherein calculating performance comprises performing path calculations by applying the received traffic metrics to thresholds, wherein the thresholds provide a value difference within which two paths are considered to be equal.

17. The medium of claim 15, wherein the traffic metrics represent at least one of path latency and packet loss and wherein selecting the path comprises selecting the path having a lowest path latency.

18. A branch node comprising:

a communications interface configured to receive a packet at the branch node in an established session, the packet having a source node and a destination node;

a processor coupled to the communications interface and to a memory, and configured to implement:

a path metrics monitor configured to receive Service Level Agreement (SLA) metrics of links between sites in the SD-WAN topology from at least a portion of the peers of the brand node, the SLA metrics received at the branch node out-of-band in protocol extension packets through secure tunnels of the SD-WAN topology; and a topology and path selection engine configured to calculate performance of a plurality of possible paths from the source node to the destination node by combining SLA metrics for each link in the respective path, the source node and the destination node being within the SD-WAN topology, and to select a path at the branch node from the source node to the destination node based on the calculated performance.

19. The branch node of claim 18, wherein the received traffic metrics comprise existing site-to-site monitoring collected by point-to-point peers independent of receiving a poll.

20. The branch node of claim 18, wherein the topology and path selection engine is further configured to compare traffic metrics of links of a candidate path to a cost range for other candidate paths.

* * * * *